J. A. OHLSSON.
BALL BEARING.
APPLICATION FILED NOV. 14, 1918.
1,311,769.
Patented July 29, 1919.
2 SHEETS—SHEET 1.
Fig. 1.
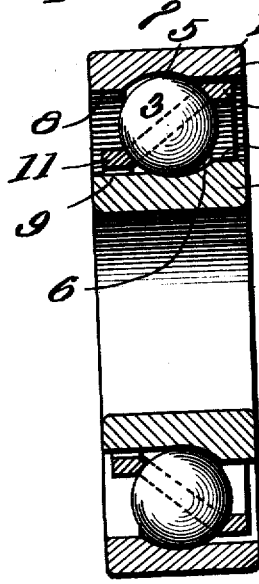
Fig. 2.
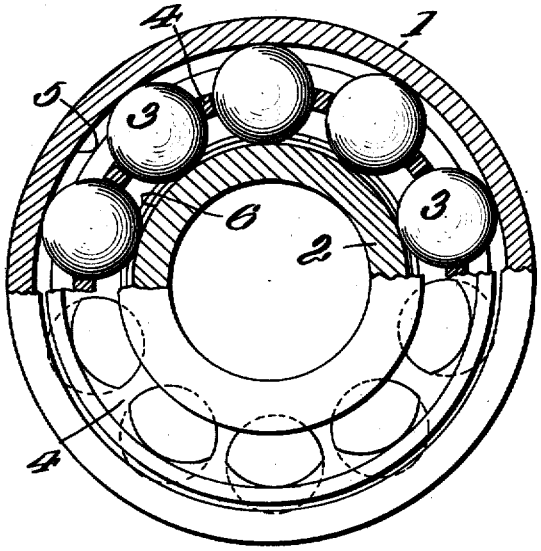
Fig. 3.
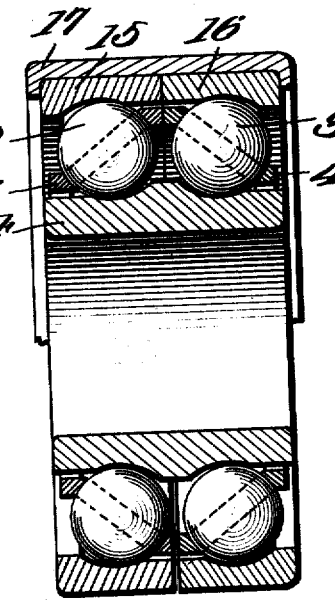
Fig. 10.
Inventor
J. A. Ohlsson,
By H. R. Kerslake
Attorney

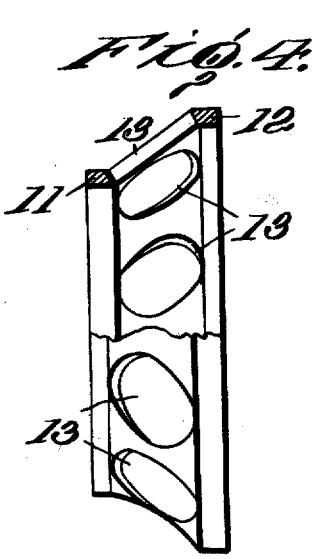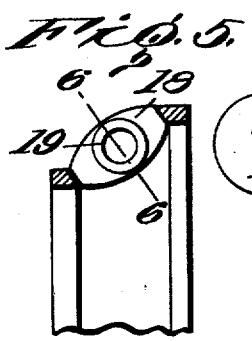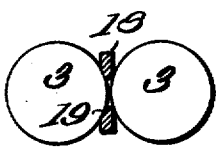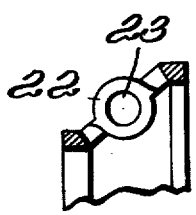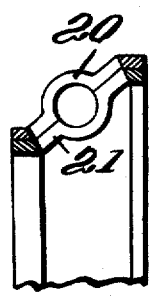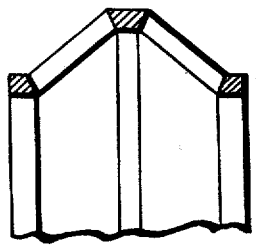

UNITED STATES PATENT OFFICE.

JOHAN ABRAHAM OHLSSON, OF STOCKHOLM, SWEDEN, ASSIGNOR TO KLOSTERS AKTIE BOLAG, OF STOCKHOLM, SWEDEN, A CORPORATION OF SWEDEN.

BALL-BEARING.

1,311,769.  Specification of Letters Patent.  Patented July 29, 1919.

Application filed November 14, 1918. Serial No. 262,571.

*To all whom it may concern:*

Be it known that I, JOHAN ABRAHAM OHLSSON, a subject of the King of Sweden, and resident of Beridarebansgatan 17, Stockholm, in the Kingdom of Sweden, engineer, have invented certain new and useful Improvements in Ball-Bearings, of which the following is a specification, reference being had therein to the accompanying drawings.

This invention relates to ball bearings of that class, in which the outer and inner rings are provided with grooves for the ball set (or ball sets). According to the invention the ridge or the flange located at one side of the groove of the outer ring or the inner ring or both the said rings is so low, that one of the rings, after the balls have been located on or in the other ring and are held by a suitable cage, can be forced into its place either with a slight deformation of the balls or after the outer ring has been heated and the distance between the rings thus has been temporarily increased. Owing to the said arrangement of the rings the said cage may consist of a solid ring, preferably conical, which is provided with transverse holes for the balls respectively.

Figures 1 and 2 of the accompanying drawings show in a longitudinal section and in a side view partially in cross section a ball bearing provided with one row of balls and arranged in accordance with this invention. Fig. 3 is a longitudinal section of two forms of a ball bearing provided with two rows of balls, said bearing being arranged in accordance with the invention. Figs. 4 to 10 inclusive show different forms of the ball cage.

1, Figs. 1 and 2, is the outer ring of the bearing, 2 its inner ring, 3 the balls and 4 the ball cage. The said rings 1 and 2 are provided with grooves 5 and 6 respectively for the balls. The difference between the radii of the grooves and the balls is very slight. As seen from Fig. 1 the ridge or flange 7 of the outer ring and located at the right side of the groove 5 is somewhat lower than the ridge or flange 8 located at the opposite side of the ball set. The same is the case with the ridges 9, 10 of the inner ring but the lower ridge is here located at the left side of the ball set. The cage 4, shown also in Fig. 4, is of an especially simple construction. It consists of a conical ring provided, if wanted, with flanges 11, 12 for increasing the firmness of the ring. In the said ring openings 13 are provided, in which the balls are located and the diameter of which is slightly greater than the diameter of the balls. The ring is sustained by the balls and prevented by the same from falling down to any of the rings 1 and 2.

The bearing is put together for instance in such manner, that the cage is mounted on the inner ring and the balls then put into the openings 13 of the cage. The height of the ridge 7 is so adapted, that the outer ring 1 may then be forced on the set of balls either with a slight deformation of the balls or after the outer ring has been heated and thus temporarily expanded. Or, vice versa, the cage 4 with the balls may be mounted in the outer ring 1 and the inner ring 2 then forced into the set of balls, after the outer ring has been heated if necessary. Evidently, only the ridges 7, 8 of the outer ring may be arranged as stated for rendering possible the putting together of the bearing in the manner first described.

As seen from the above, the construction of the bearing is very simple. Owing to its construction it is able to sustain a very great end thrust in one direction. By providing two coöperating bearings acting in opposite axial directions end thrusts in both directions may be sustained.

In Fig. 3 a double bearing is shown, acting in the manner just described. The two sets of balls have a common inner ring 14 but the outer ring is divided into two parts 15, 16, one for each set of balls 3, which parts, heated, if wanted, may be forced on the ball sets from opposite ends of the bearing. According to the top part of Fig. 3, the parts 15, 16 are connected by a ring 17, consisting of two or more sections suitably fixed to one another. For each ball set a cage 4 is provided, the said cages may however be made integral or in one piece, as shown in Fig. 8. Instead of the outer ring being made in two pieces the inner ring may be arranged in an analogous manner.

Figs. 5 and 6 show in a longitudinal section and in a section on the line 6—6 of Fig. 5 respectively a ball cage, in which the material 18 located between two adjacent openings has plane surfaces and is provided with an opening 19, the edges of which are beveled on both sides of the part 18, so that for the balls 3 calottes are provided.

Owing to this arrangement the balls are located very close to one another, so that a greater number of balls may be provided in the bearing.

Fig. 7 shows in a longitudinal section a ball cage arranged in a manner analogous to Figs. 5 and 6 but made in two parts 20, 21, which, as the bearing is being mounted, are pushed one into the other and then held together by the balls when mounted in the cage.

According to Fig. 9, which shows a part of a cage in a longitudinal section, the part 22 located between two adjacent openings is ring shaped and has originally been located substantially in the conical surface of the cage and has then been turned through an angle of 90°. The said part has an opening 23 for the same purpose as the opening 19 in Figs. 5 and 6.

Fig. 10 shows in a longitudinal section a further form of the ball cage 24 adapted for a bearing arranged in accordance with this invention. It has substantially the same shape as the cage shown in Fig. 4 but the material of the cage is so thick, that it fills up substantially the whole space between the two rings 1, 2 of the bearing, in order that, if any ball or balls should be broken into pieces the latter may be prevented from leaving the bearing and causing deformation of parts more expensive.

Having now described my invention, what I claim as new and desire to secure by Letters Patent is:

1. A ball bearing comprising an inner ring having a plurality of concentrically arranged cylindrical outer surfaces with an annular circumferential groove located between the same, the cylindrical surface of the circumference on one side of the groove being a less distance away from the axis of the ring than the cylindrical surface of the circumference on the other side of the groove, an outer ring provided on its inner surface with an annular groove, said outer ring having a plurality of concentrically arranged cylindrical inner surfaces and an annular groove located between the same, the cylindrical surface of the inner circumference of the outer ring, at one side of the groove, being a less distance away from the ring axis than the cylindrical surface of the inner circumference at the other side of the outer ring, a ball cage located between the rings and having radial openings, and balls located in said openings and engaging the walls of said grooves.

2. In a ball bearing as defined in claim 1, the ball cage consisting of a conical ring having cylindrical ends of different diameters.

3. A ball bearing comprising an inner ring having a circumferential groove, an outer ring having a groove in its inner circumference, a conical ring located between the rings and having cylindrical ends of different diameters, said conical ring having radial apertures, radial webs located between the cylindrical ends of the conical ring and having flat side faces, and balls located in the radial apertures and engaging said grooves and the sides of said webs.

In witness whereof I have hereunto signed my name.

JOHAN ABRAHAM OHLSSON.